United States Patent
Wagner

[15] 3,642,494
[45] Feb. 15, 1972

[54] METHOD OF COMMINUTING LEGUMES

[72] Inventor: Joseph R. Wagner, Moraga, Calif.

[73] Assignee: The United States of America as represented by the Secretary of Agriculture

[22] Filed: Oct. 23, 1968

[21] Appl. No.: 770,070

[52] U.S. Cl. ............................................................99/98
[51] Int. Cl. ................................................A23l 1/20
[58] Field of Search................................................99/98, 99

[56] References Cited

UNITED STATES PATENTS 3,126,286  3/1964  Moshy ........................................99/99

FOREIGN PATENTS OR APPLICATIONS 551,692  3/1943  Great Britain...........................99/99

*Primary Examiner*—Raymond N. Jones
*Assistant Examiner*—William A. Simons
*Attorney*—F. Hoffman, W. Bier and W. Takacs

[57] ABSTRACT

Processes for preparing bean-milk, purees, and other food products of improved flavor from edible legume seeds, which include the feature that raw legume seeds are comminuted in the presence of added acid, e.g., HCl or $H_3PO_4$.

4 Claims, No Drawings

METHOD OF COMMINUTING LEGUMES

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for producing food products of improved flavor from edible seeds of legumes, e.g., conventional dry beans or peas. Further objects of the invention will be evident from the following description wherein parts and proportions are by weight unless otherwise specified.

The problems with which the invention is concerned and application of the invention are explained below having particular reference to beans. It is to be understood, however, that a similar situation is encountered with the seeds of other plants of the pea family and in its broad compass the invention is applicable to legume seeds in general, typically seeds of the genus Phaseolus including the common beans such as large white, small white, pinto, red kidney, cranberry, lima, etc.; the genus Pisum including smooth and wrinkled peas; the genus Vigna including the blackeye beans (or blackeye peas, as they are often termed); the genus Lens including lentils; the genus Cicer including garbanzo or chick peas; the genus Soja, that is, soybeans; etc. The legume seeds to which the process of the invention is applied are the usual dry seeds available in commerce. For example, in the case of beans, these products are often referred to as dry shell beans because the product includes only the mature seeds, the pods having been removed in one of the steps in their production.

Although much of the bean crop is consumed in the form of whole beans such as baked beans, soups, or similar dishes, there is also a trend to utilizing them for products wherein their natural form is altered by comminution. Depending on the use selected, the final products may be dry powders or flakes or they may contain more or less water to provide a puree or a relatively thin liquid useful as a base for imitation milks. In preparing such products, beans may be cooked first and then comminuted, or, the beans may be comminuted first and cooking applied subsequently. Unfortunately, both of these alternative techniques give rise to certain problems.

When the beans are cooked first, there is much difficulty in applying the comminution. The partly ground particles tend to agglomerate into dense masses and adhere to screens and milling surfaces. Furthermore, the cells of the cooked beans separate readily, but their walls are elastic and resilient so that they resist the desired rupture of the individual cells. To avoid these difficulties it is preferred to apply the comminution to the beans while they are in the raw state. Uncooked dry beans are comparatively easy to grind and their cell walls can be easily broken—this, of course, facilitates digestion after subsequent cooking and ingestion. No problems of stickiness or agglomeration are encountered even if the comminution is carried out in the presence of added water. However, where comminution is applied to the raw beans (with or without added water), problems in another area are encountered, i.e., development of objectional odor and flavor in the products. For example, when raw beans are ground with water to form a slurry, the product almost immediately develops a rancid-type of odor, one suggestive of drying (oxidizing) linseed oil. Moreover, this objectional flavor persists when the product is subjected to further processing steps such as drying, freezing, or cooking. As a result, any products made from the slurry, whether canned, frozen, dehydrated, or otherwise processed, will retain the objectional odor and taste.

It is a particular object of the invention to provide procedures whereby to surmount the problems outlined above. A special advantage of the invention is that it provides the means whereby comminution may be applied to raw beans—to take the advantage of the good milling characteristics of the raw seeds—and at the same time avoiding the formation of objectionable odor and flavor in the products.

A critical feature in accordance with the invention is that acid is added to the raw beans as they are being comminuted or directly after comminution, the former being the preferable treatment. By this relatively simple expedient of acidification, the development of objectional odor and flavor is eliminated or at least substantially minimized.

For use as the added acid, I prefer hydrochloric acid because it is effective, inexpensive, and particularly because eventual neutralization of the product (with sodium hydroxide, carbonate, or bicarbonate) yields sodium chloride—a common additive in most food products. The hydrochloric acid is generally employed in aqueous solutions but may be added in the form of hydrogen chloride gas. Moreover, acids other than hydrochloric can be employed as the primary consideration is establishment of a low pH. Thus, for example, one may employ such strongly ionized acids as sulfuric or phosphoric. Weaker acids such as citric, tartaric and lactic may also be used. However, these weaker acids are not preferred because large proportions are necessary to attain the desired reduction in pH. Acetic acid is too weakly ionized to be of any practical usefulness. In view of the above considerations, generically one may employ any acid which is more strongly ionized than acetic (i.e., has an ionization constant greater than $1.86 \times 10^{-5}$) and which is nontoxic. It is, of course, within the scope of the invention to use mixtures of two or more acids, for example, a mixture of hydrochloric and phosphoric acid.

In general, it has been observed that addition of enough acid to establish a pH in the mixture of less than 3.8 will provide an improvement in flavor over that attained in the absence of added acid. Usually, it is preferred to employ pH's of 3.0 or below whereby one attains not only an improvement in flavor but also an additional benefit in that the amount of protein extracted from the beans is increased. The process of the invention may be practiced at very low pH's but ordinarily there is no practical purpose gained by going below a pH of 1. As noted hereinabove, the primary consideration of the added acid is to establish a reduced pH. However, there may be some variation in effect between different acids applied at the same pH. Also, with different kinds of legume seeds there may be some difference in the pH which provides optimum results. In any event, that pH level which provides best results can, of course, be readily determined by applying an acid at different concentrations to pilot samples of the beans to be processed and selecting the pH range which provides the desired results.

In a practice of the invention, the raw legume seeds may be ground or otherwise comminuted in the presence of only the added acid. Preferably, however, water is also added so as to attain more uniform contact of the acid with the particles of bean material as they are formed. Usually, I use at least one part of water per part of beans and a preferred ratio is about 5 to 20 parts water per part of beans. Larger ratios of water to beans can be used but will yield excessively dilute products. Of course, if a dilute product is desired this will be no disadvantage.

Following the acid treatment described above, one may proceed in various ways depending on the type of final product desired. In any case, however, the after-treatment will include (a) heating while in the acid condition and (b) neutralization thereafter to restore the pH of the bean material to its natural level. Further details on these steps are provided below. Optional steps or procedures which may be applied are, for example: Removal of fibrous material; dilution or concentration; incorporation of seasonings, flavorings, vitamin-, mineral-, or carbohydrate-supplements, gums or thickeners, etc.; application of a selected procedure for preserving the final product, such as dehydration, canning, refrigeration (cold storage temperatures or subfreezing temperatures), etc.

In preparing beverages or beverage bases, it is preferred to obtain a product essentially free from fibrous material. This can be readily accomplished. For example, the slurry obtained by comminuting the beans in the presence of acid and water is subjected to filtration or centrifugation, the latter being preferred. This yields an essentially fiber-free liquid consisting of a suspension or emulsion of fine particles of bean material in the liquid phase. Because of its resemblance to the dairy product, this liquid may be termed bean-milk.

After removal of the fiber (or directly after the acid comminution if it is desired to retain fibrous components), the bean material while still in its acid condition is heated to an enzyme-inactivating temperature, i.e., at least 185° F. Where it is desired to prepare a precooked product—as in preparing bean-milk—the heating is at about 212° F. so as to cook the material, that is, render the proteins digestible and to inactivate trypsin-inhibitors and other heat-labile toxic factors which are present in some types of beans (soybeans, for example).

Following the heating step—and preferably after cooling to room temperature—the bean material is neutralized to its original (natural) pH by addition of sodium hydroxide. Other alkalizers such as sodium carbonate or sodium bicarbonate can, of course, be used for the neutralization but are generally not preferred because of their foaming action.

Further treatment of the neutralized product is simply a matter of choice. The product can be directly applied to consumption, it may be held at refrigerator temperatures, it may be preserved by dehydration, canning, or freezing, it may be supplemented with nutrient or flavor ingredients, etc. Moreover, the product may be used to supplement other food preparations such as soups, gravies or sauces, stews or other meat-containing products, etc.

As noted hereinabove, the step of heating is applied to bean material while still in an acid condition. In the event that the pH selected for the acid comminution is especially low, some hydrolysis of di- or polysaccharide constituents may occur when heating is applied. If it is desired to avoid this, the acid material may be partly neutralized—brought to a pH of about 3.5—by addition of sodium hydroxide before the heating step is applied. Complete neutralization to original bean pH would, of course, be applied in the regular way, that is, after the heating step is completed and the product cooled.

EXAMPLES

The invention is further demonstrated by the following illustrative examples, wherein the following general procedure was used.

The comminution was carried out in a conventional blender equipped with a bowl and a rotating blade assembly in the base of the bowl for comminuting and blending the material under treatment. In each run (carried out at room temperature), 10 grams of dry legume seeds, 100 grams of water, and varying amounts of acid were introduced into the blender and the blade operating for five minutes to obtain a uniform slurry of liquid and finely divided bean material.

The slurry was then centrifuged to segregate the fibrous material from the supernatant liquid fraction. The latter was heated to 200°–212° F. (to inactivate enzymes and cook the product), cooled to room temperature, and neutralized to the original pH by adding a controlled amount of NaOH. The liquid (or "bean-milk," as it may be termed) was then examined for rancidity by smelling and tasting. The liquid was also analyzed for nitrogen content by the Kjeldahl procedure. The resulting data in conjunction with the nitrogen content of the untreated legume seeds was used to calculate the recovery of protein in the product.

EXAMPLE 1

In these runs the legume seeds were soybeans, Yellow Lee variety, having the following composition:

| | |
|---|---|
| Nitrogen | 6.14% |
| Fat | 19.14% |
| Soluble sugars | 8.2% |

Two series of runs were made, one with hydrochloric acid, the other with $H_3PO_4$, and using varying amounts of these acids to provide the pH's listed below. In one run no acid was added, thus to provide a control.

The results obtained are tabulated below:

TABLE I

Soybeans

| Run | Acid | pH | Rancidity | Protein recovery, % |
|---|---|---|---|---|
| 1 Control | None | 6.70 | Yes | 54.0 |
| 2 | HCl | 3.02 | No | 48.0 |
| 3 | do. | 2.82 | No | 67.8 |
| 4 | do. | 2.46 | No | 77.7 |
| 5 | do. | 2.14 | No | 81.6 |
| 6 | do. | 1.01 | No | 78.0 |
| 7 | $H_3PO_4$ | 2.97 | No | 45.4 |
| 8 | do. | 2.65 | No | 66.0 |
| 9 | do. | 2.40 | No | 71.2 |
| 10 | do. | 2.34 | No | 63.5 |
| 11 | do. | 2.31 | No | 65.1 |
| 12 | do. | 1.74 | No | 78.7 |

EXAMPLE 2

In these runs the legume seeds were California small white beans, having the following compositions:

| | |
|---|---|
| Nitrogen | 3.22% |
| Fat | 1.75% |
| Soluble sugars | 4.75% |

Two series of runs were made, one with hydrochloric, the other with $H_3PO_4$, and using varying amounts of these acids to provide the pH's listed below. In one run no acid was added, thus to provide a control.

The results obtained are tabulated below:

TABLE II

California small white beans

| Run | Acid | pH | Rancidity | Protein recovery, % |
|---|---|---|---|---|
| 1 Control | None | 6.50 | Yes | 40.4 |
| 2 | HCl | 2.93 | No | 33.5 |
| 3 | do. | 2.40 | No | 57.5 |
| 4 | do. | 2.00 | No | 62.4 |
| 5 | do. | 1.74 | No | 64.3 |
| 6 | do. | 1.60 | No | 63.4 |
| 7 | do. | 1.50 | No | 61.2 |
| 8 | $H_3PO_4$ | 2.89 | No | 36.3 |
| 9 | do. | 2.60 | No | 54.3 |
| 10 | do. | 2.25 | No | 67.4 |
| 11 | do. | 2.11 | No | 68.3 |
| 12 | do. | 2.01 | No | 66.8 |
| 13 | do. | 1.97 | No | 68.6 |
| 14 | do. | 1.55 | No | 62.1 |

EXAMPLE 3

Samples of raw soybeans were comminuted in a blender together with water or water plus phosphoric acid, in the proportions of one part soybeans to 10 parts of liquid, at room temperature. Each slurry was transferred to a 25 ml. Erlenmeyer flask which was then closed with a tight rubber cap.

To determine the nature and relative amounts of volatile products present, samples of enclosed airspace above the slurry were withdrawn with a syringe by insertion of the needle through the rubber cap, and drawing the gas sample into the syringe, a 1.4 ml. portion of the headspace vapor was then injected into the port of a gas-liquid chromatograph equipped and operated in a manner previously found useful in the separation and identification of the volatile compounds formed in the oxidative degradation of unsaturated fatty acids and their esters. (Analysis of headspace vapor samples made on a F and M GLC unit equipped with 500 ft. by 0.03 in. OV-101 (silicone oil) + 1 percent Igepal column. Input splitter not used so that total injected sample was passed through the column. Helium used as carrier gas. Linear velocity of the gas stream ≅ 31 cm./sec. Column programmed at 73° C. isothermally.)

Tentative identification of the 5 largest peaks of the control sample chromatogram was made by comparing their column retention times with those of known volatile products of the oxidative degradation of unsaturated fatty acids and their esters.

Comparison was made of the relative heights of the peaks recorded for the three samples at each of the five retention times and interpreted as a measure of the relative amounts of the volatile compound or group of compounds present in the slurry samples.

The results are summarized in TAble III. It is readily apparent that the use of acidification during the blending of the raw soybeans has sharply reduced the formation of the volatile compounds represented by peaks (a) and (b). Formation of the volatile compounds represented by peaks (c), (d), and (e) has been almost completely prevented by acidification at pH 3.5 and completely at pH 2.0.

TABLE III

| Sample | 1 (control) | 2 (acidified) | 3 (acidified) |
|---|---|---|---|
| pH | 6.7 | 3.5 | 2.0 |
| GL Chromatograms: | | | |
| Peak (a); retention time 10'18.7"; tentative identification: *Methane, ethane or mixture of the two.* Percent of control sample concentration indicated by peak heights: | 100 | 54 | 27 |
| Peak (b); retention time 10'37.5"; tentative identification: *Propane, butane or mixture of the two.* Percent of control sample concentration indicated by peak heights: | 100 | 50 | 21 |
| Peak (c); retention time 11'24"; tentative identification: *Pentane, acetaldehyde or mixture of the two.* Percent of control sample concentration indicated by peak heights: | 100 | 1.3 | None |
| Peak (d); retention time 15'37.5"; tentative identification: *Pentanal.* Percent of control sample concentration indicated by peak heights: | 100 | None | None |
| Peak (e); retention time 21'15"; tentative identification: *Hexanal.* Percent of control sample concentration indicated by peak heights: | 100 | None | None |

EXAMPLE 4

Samples of raw soybeans were comminuted in a blender together with water or water plus phosphoric acid, in the proportions of one part soybeans to 10 parts liquid, at room temperature. The resulting slurries were then heated to boiling (212° F.) and simmered for an hour. Sufficient water was added to replace evaporation losses, and aqueous NaOH was added to the acidified samples to restore their pH to that of the nonacidified control.

Twenty milliliter portions of the purees were placed in separate 50 milliliter Erlenmeyer flasks which were then stoppered with rubber caps. Samples of the headspace gas were then withdrawn and analyzed by GLC as described in Example 3. The results are summarized in the ca); table. It is readily apparent that acidification during comminution and heating has reduced the formation of the volatile compound or compounds represented by peaks *b* and *c*; and has completely prevented the formation of the compounds represented by peaks *d* and *e*.

TABLE IV

| Sample | 1 (control) | 2 (acidified) | 3 (acidified) |
|---|---|---|---|
| pH | 6.6 | 3.7 | 2.4 |
| GL Chromatograms: | | | |
| Peak (a); retention time 10'18.7"; tentative identification: *Methane, ethane or mixture of the two.* Percent of control sample concentration indicated by peak heights: | 100 | 83 | 117 |
| Peak (b); retention time 10'37.5"; tentative identification: *Propane, butane or mixture of the two.* Percent of control sample concentration indicated by peak heights: | 100 | 79 | 72 |
| Peak (c); retention time 11'24"; tentative identification: *Pentane, acetaldehyde or mixture of the two.* Percent of control sample concentration indicated by peak heights: | 100 | 11 | 4 |
| Peak (d); retention time 15'37.5"; tentative identification: *Pentanal.* Percent of control sample concentration indicated by peak heights: | 100 | None | None |
| Peak (e); retention time 21'15"; tentative identification: *Hexanal.* Percent of control sample concentration indicated by peak heights: | 100 | None | None |

EXAMPLE 5

Three samples of Navy beans (California small whites) were comminuted in a blender together with water or water plus phosphoric acid, in the proportions of one part beans to 10 parts liquid, at room temperature. The resulting slurries were then heated to boiling (212° F.) and simmered for an hour. Sufficient water was added to replace evaporation losses, and aqueous NaOH was added to the acidified samples to restore their pH to that of the nonacidified control.

Twenty milliliter portions of the purees were placed in separate 50 milliliter flasks which were stoppered with rubber caps. Samples of the headspace gas were then withdrawn and analyzed by GLC as described in Example 3. The results are summarized in the following table. It is readily apparent that the acidification treatment reduced the amounts of the volatile compounds represented by peaks *a*, *b*, and *c*, and completely prevented the formation of the compounds represented by peaks *d* and *e*.

TABLE V

| Sample | 1 (control) | 2 (acidified) | 3 (acidified) |
|---|---|---|---|
| pH | 6.4 | 3.6 | 2.4 |
| GL Chromatograms: | | | |
| Peak (a); retention time 10'18.8 "; tentative identification: *Methane, ethane or mixture of the two.* Percent of control sample concentration indicated by peak heights: | 100 | 62 | 35 |
| Peak (b); retention time 10'37.5"; tentative identification: *Propane, butane or mixture of the two.* Percent of control sample concentration indicated by peak heights: | 100 | 90 | 76 |

Peak (c); retention time 11'24";
tentative identification: *Pentane, acetaldehyde or mixture of the two.*
Percent of control sample concentration indicated by peak heights: 100 51 51

Peak (d); retention time 15'37.5";
tentative identification: *Pentanal.*
Percent of control sample concentration indicated by peak heights: 100 None None Peak (e); retention time 21'15";
tentative identification: *Hexanal.*
Percent of control sample concentration indicated by peak heights: 100 None None

Having thus described the invention, what is claimed is:

1. In the process of preparing liquiform products from legume seeds wherein legume seeds are comminuted in the presence of water to form a slurry, the slurry treated to remove fibrous components and then cooked, the improvement which comprises
applying the comminution to raw legume seeds in the presence of added nontoxic acid in an amount to provide a pH less than 3.8, and
neutralizing the slurry to its natural pH after it has been cooked.

2. A process for preparing food products of improved flavor from edible legume seeds which comprises
comminuting raw edible legume seeds in the presence of water and added hydrochloric acid in an amount to provide a pH less than 3.0.

3. A process for preparing food products of improved flavor from edible legume seeds which comprises
comminuting raw edible legume seeds in the presence of water and added nontoxic acid in an amount to provide a pH less than 3.5,
heating the resulting slurry while still in its acid condition to an enzyme-inactivating temperature, then
neutralizing it to its natural pH.

4. A process for preparing food products of improved flavor from edible legume seeds which comprises
comminuting raw edible legume seeds in the presence of water and added nontoxic acid in an amount to provide a pH less than 3.5,
centrifuging the resulting slurry to remove fibrous material,
heating the residual liquid fraction while at a pH less than 3.8 to about 200°–212° F., then
cooling it and neutralizing it to its natural pH.

* * * * *